United States Patent [19]

Bishop

[11] 4,363,066
[45] Dec. 7, 1982

[54] PROTECTIVE RELAY

[75] Inventor: Martin T. Bishop, Wilkins Township, Allegheny County, Pa.

[73] Assignee: Westinghouse Electric Corp., Pittsburgh, Pa.

[21] Appl. No.: 245,788

[22] Filed: Mar. 20, 1981

[51] Int. Cl.³ .............................................. H02H 3/26
[52] U.S. Cl. ........................................ 361/85; 361/87
[58] Field of Search ...................... 361/76, 77, 85, 86, 361/87, 210

[56] References Cited

U.S. PATENT DOCUMENTS 1,702,454  2/1929  Todd .............................. 361/77 X
4,297,740  10/1981  Hagberg .............................. 361/67

OTHER PUBLICATIONS

IEEE Transactions on Power Apparatus and Systems, vol. PAS-90, No. 3, May/Jun. 1971, pp. 1190-1200.
Instruction Leaflet 41-1107A, K CW A.
Innovative Relay Methods for Det. High-Imp. Faults on Dist. Ckts., Amer. Power Conf., Apr. 23-26, 1979, L. A. Kilar et al.
Improved Relay Schemes for Det. of Fallen Conductors on 3φ, 4 Wire Dist. Ckts., Kilar, Rosado, Shankle & Lee.
Summary and Status Report on Research to Det. and De-Energize High-Imp. Faults on 3φ, 4 Wire Dist. Ckts., Kilar & Lee.

*Primary Examiner*—Reinhard J. Eisenzopf
*Attorney, Agent, or Firm*—D. R. Lackey

[57] ABSTRACT

A percent unbalance or ratio ground relay which detects open phase conductors on electrical distribution circuits, as well as single-phase-to-ground faults regardless of fault impedance, by providing an operating quantity responsive to zero sequence current, and a restraining quantity responsive to a pre-fault balanced phase current minus the zero sequence current. This restraint torque arrangement causes the relay to operate on true ratio unbalance, regardless of load.

6 Claims, 7 Drawing Figures

PROTECTIVE RELAY

BACKGROUND OF THE INVENTION

1. Field of the Invention

The invention relates in general to protective relay apparatus for electrical power systems, and more specifically to protective relay apparatus for detecting and clearing single-phase-to-ground faults regardless of fault impedance.

2. Description of the Prior Art

A conventional distribution substation for supplying three-phase and single-phase loads includes a three-phase circuit breaker equipped with phase overcurrent relays, and sometimes a ground-current relay. Reclosers and fuses complete the protection of the distribution circuit. Coordination is necessary between these protective devices in order to isolate only the required portion of the distribution circuit when a fault occurs. Because of normal circuit load unbalances, as well as normal cold-load pickup and switching surges, a ground relay, if used, must be set quite high in order to prevent nuisance tripping of the circuit breaker. Broken conductors close to or touching the ground through high impedance paths may not produce enough current or circuit unbalance to operate the phase overcurrent protective devices, or the ground relay.

Thus, it would be desirable to provide a new and improved protective relay which will detect such high impedance single-phase-to-ground faults. Such a relay, however, must meet the stringent requirements of the electric utility industry, including sensitivity, discrimination, reliability, security, low cost, ruggedness, relative simplicity, easy to apply and install, low maintenance, and it must be capable of properly coordinating with other protective schemes.

SUMMARY OF THE INVENTION

Briefly, the present invention is a new and improved percent unbalance relay which detects single-phase-to-ground faults, regardless of impedance, and open phases. The operating quantity is a function of zero sequence current, while the restraining quantity is a function of a pre-fault phase current less the zero sequence current. In the preferred embodiment of the invention, the percent unbalance relay is in the form of an electroresponsive induction disc relay, which inherently provides the desired coordination characteristic for cooperating with other protective devices. The induction disc construction also satisfies the reliability and ruggedness requirements, and it is easy to install and maintain. It has a relatively low initial cost, and it can use the outputs of the phase current transformers already required for the overcurrent relays at the substation. Sequence filters are not required. Since it will detect low impedance single-phase-to-ground faults, as well as those of high impedance, it can replace the ground relay, adding further to its cost attractiveness. This relay is also sensitive, discriminatory, and secure, because of the variable restraint aspect of the invention wherein the relay operates only on true ratio unbalance regardless of load level.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF THE PREFERRED EMBODIMENTS

Figure 1:
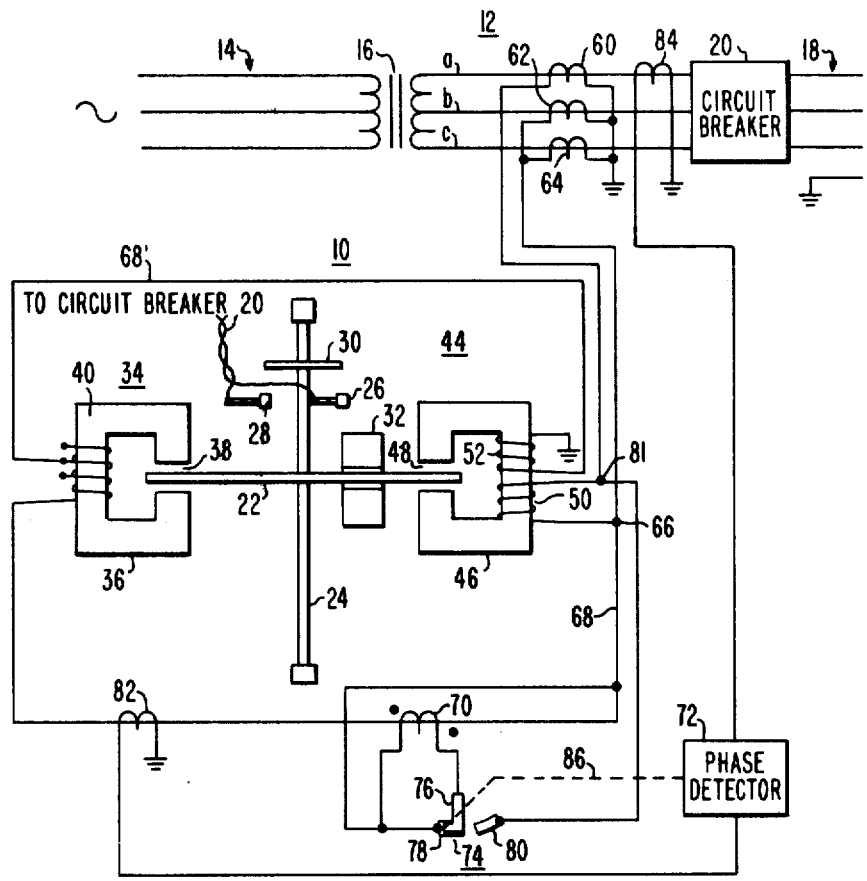
FIG. 1 is a schematic diagram of a percent unbalance relay constructed according to a first embodiment of the invention, with the relay being shown with its contacts open, and with a CT shorting switch in the shorting position.

Referring now to the drawings, and to FIG. 1 in particular, there is shown a new and improved percent unbalance relay 10 constructed according to the teachings of the invention. In a preferred embodiment of the invention, relay 10 is an electromechanical relay, preferably of the induction disc type shown. The induction disc construction is preferred because it provides the desired coordination with other protective devices, such as breakers, reclosers, and fuses. Induction cup construction, or balance beam construction, may also be used. However, since these devices are inherently faster than the induction disc, they would have to be coupled with a suitable delay timer. Further, while electromechanical construction is preferred, the operating concepts disclosed herein may also be advantageously applied to solid state construction, and thus the invention applies broadly to a new and improved percent unbalance relay, regardless of its hardware form.

Relay 10 is associated with a substation 12 in which the transmission voltage of a three-phase transmission line 14 is stepped down to a distribution level via a step-down transformer 16 which supplies a three-phase, four-wire distribution circuit 18 via a three-phase circuit breaker 20. Relay 10, as hereinbefore stated, preferably is of the electroresponsive induction disc type, having an electroconductive armature 22 in the form of a disc. Armature 22 is mounted for rotation on a suitably journaled shaft 24. The rotation of armature 22 and thus shaft 24 is arranged to cause the actuation of electrical contacts. For purposes of example, a first contact 26 is shown mounted on shaft 24. Rotation of shaft 24 carries the first contact 26 into, or out of, engagement with a second contact 28, depending upon rotational direction. Closure of the first and second contacts 26 and 28 may be employed to complete an electrical circuit for any desired protective function, such as for initiating the tripping of circuit breaker 20. A spiral spring 30 biases shaft 24 to urge the movable first contact 26 away from the stationary contact 28. If desired, spring 30 may be a current carrying element which may additionally function to mount the movable first contact 26.

Rotation of armature 22 is damped and retarded by suitable damping means, such as a permanent magnet 32, which provides a damping force which varies in accordance with the rate of rotation of armature 22.

In order to provide an operating torque for armature 22, which torque rotates the armature 22 in the contact closing direction, a first electromagnet 34 is provided. The first electromagnet 34 includes a magnetic core 36 configured to provide a pair of pole pieces spaced to define an air gap 38 within the armature 22 is positioned for rotation. A winding 40 is disposed in inductive relation with magnetic core 36, with winding 40 preferably being tapped, as illustrated, in order to provide a range of selectable operating characteristics.

In order to provide a restraining torque on the armature 22, which provides a torque which tends to rotate armature 22 in the contact opening direction, a second electromagnet 44 is provided. The second electromagnet 44 includes a magnetic core 46 configured to provide a pair of pole pieces spaced to define an air gap 48 within which the armature 22 is positioned for rotation. First and second windings 50 and 52 are disposed in inductive relation with magnetic core 46. Windings 50 and 52 are wound and connected such that the restraining torque is responsive to the difference between the magnetic fluxes in the magnetic core responsive to windings 50 and 52, i.e., the restraining torque is proportional to the flux produced by winding 50 minus the flux produced by winding 52. Thus, a restraining torque will only be produced when the flux produced by winding 50 exceeds that produced by winding 52.

The magnetic cores 36 and 46 are illustrated as being C-cores for purposes of example. Many other core configurations are equally suitable. For example, an E-core may be disposed on one side of the disc with the winding, or windings on the center leg, and a keeper core section on the other side of the disc.

In accordance with the invention, an operating quantity is to be provided which varies as a function of the zero sequence current flowing in the distribution circuit 18 at the substation 12, and a restraining quantity is to be provided which varies as a function of the pre-fault balanced phase current magnitude of a selected phase, minus the zero sequence current. Using a phase current for the restraint and maintaining its value at a pre-fault magnitude following a fault, makes it practical to use existing current transformers at the substation, and it eliminates the need for positive sequence current filters. In addition to cost savings, the elimination of sequence filters is an important advantage, as filtering degrades relay sensitivity. Further, by subtracting the zero sequence current from the pre-fault phase current to obtain the restraint quantity, the relay will operate on true ratio unbalance regardless of load level. The specific percent unbalance at which the relay is to operate may be precisely selected by including taps on the operate winding which receives the operating quantity. More specifically, the zero sequence current operating quantity is applied to winding 40 of the first electromagnet 34, selecting the tap on this winding which will provide the desired percent unbalance operating characteristic. The pre-fault phase current is applied to winding 50 of the second electromagnet 44, and the zero sequence current is applied to winding 52 of the second electromagnet 44.

FIG. 1 illustrates a preferred embodiment for providing the phase current quantity and for assuring that this quantity is substantially the same following a single-phase-to-ground fault, as it was immediately prior to the fault. Current transformers 60, 62 and 64 are disposed to measure the current in phases a, b and c, respectively, of the distribution circuit 18. Common ends of the current transformers are connected to ground. One of the phases is selected to provide the current for the restraint winding 50, such as phase a, as illustrated. After the current from current transformer 60 is directed through winding 50, the output side of winding 50 and the remaining ends of current transformers 62 and 64 are connected together at terminals 66. A conductor 68, connected to terminal 66, thus provides the ground or zero sequence current $3I_O$. Conductor 68 is connected to one end of winding 40, a conductor 68' interconnects a tap on winding 40 with one end of winding 52, and the remaining end of winding 52 is grounded. Thus, zero sequence current $3I_O$ flows through the winding 40 of the operate electromagnet 34, and zero sequence current $3I_O$ flows through winding 52 of the restraint electromagnet 44. Phase current $I_a$ flows through winding 50 of the restraint electromagnet 44.

If a single-phase-to-ground fault occurs in phases b or c, the current through winding 50 will be substantially the same following the fault as it was before the fault. If the single-phase-to-ground fault is in phase a, however, the phase a current will increase following the fault by an amount equal to $3I_O$. Thus, when the fault is in phase a, the phase a current signal provided by current transformer 60 must be reduced by an amount equal to $3I_O$ before the circuit is connected to winding 50. In the FIG. 1 embodiment, this is accomplished by connecting a 1:1 or auxiliary current transformer 70 to measure the $3I_O$ current flowing in conductor 68. A make-before-break shorting switch 74 is provided which has a movable contact 76 and first and second stationary contacts 78 and 80. The dotted end of current transformer 70 is connected to conductor 68, between the location of current transformer 78 on conductor 68 and terminal 66. This dotted end is also connected to the first stationary contact 78. The remaining end of current transformer 70 is connected to the movable contact 76. The second stationary contact 80 is connected to the junction 81 between the output of current transformer 60 and the input to winding 50.

A phase detector 72 is connected to be responsive to the $3I_O$ current and the phase a current $I_a$, such as via auxiliary current transformers 82 and 84, respectively. The auxiliary current transformers are illustrated merely for purposes of example. The output of CT60 may be directed through phase detector 72 before it reaches terminal 81, and the output side of winding 52 may be directed through the phase detector 72 before the $3I_O$ conductor 68' is connected to ground.

Figure 2:
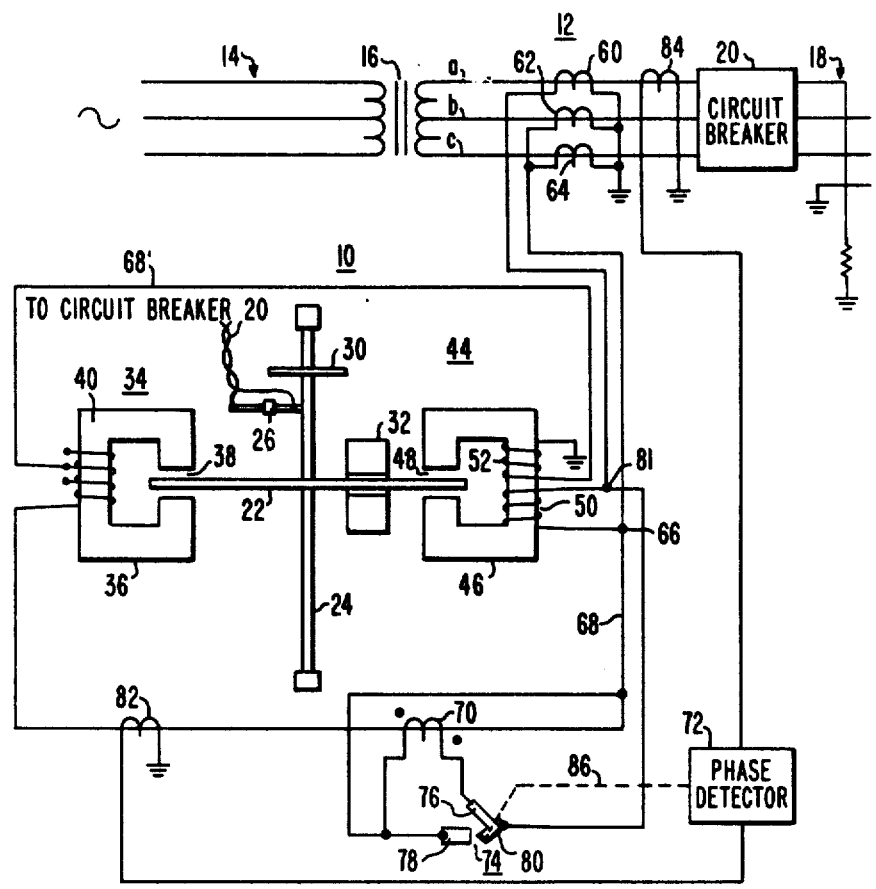
FIG. 2 is a diagram of the relay shown in FIG. 1, except it is illustrated with its contacts closed, and with the CT shorting switch in the non-shorting position.

Switch 74 includes an operator 86 which is normally in a position which causes switch 74 to short the output of current transformer 70, i.e., movable contact 76 is in engagement with the first stationary contact 78. When a single-phase-to-ground fault occurs, and the $3I_O$ and the phase a current $I_a$ are not in phase, indicating that the fault is not in phase a, the phase detector 72 provides an output which selects the shorted position of switch 74, and since the switch is already in this configuration, current transformer 70 remains shorted during the fault. When a single-phase-to-ground fault occurs in phase a, as indicated in FIG. 2, phase detector 72 will detect that the $3I_O$ current and the phase a current $I_a$ are in phase. Upon such a detection, it changes its output to cause the operator 86 to first move the movable contact 76 into engagement with the second stationary contact 80, and to then move the movable contact 76 out of engagement with the first stationary contact 78, to the final position shown in FIG. 2. With a 1:1 ratio, current transformer 70 will have a current flow therein equal to the current flowing in conductor 68, i.e., $3I_O$. Since contact 80 is connected to the output 81 of the phase a current transformer 60, the $3I_O$ current flowing in current transformer 60 due to the phase a fault will be diverted away from winding 50 through current transformer 70 and re-inserted into conductor 68 such that it flows in inductive relation with current transformer 70 and then through windings 40 and 52. Thus, the current $|I|$ flowing through winding 50 equals the phase a current $|I_a|$, unless the zero sequence current is in phase with $|I_a|$, at which time the current $|I|$ flowing through winding 50 will equal $|I_a - 3I_O|$.

The torque equations for relay 10 are as follows:

$$\text{Operating Torque} = K_1 N_1^2 |3I_O|^2 \quad (1)$$

$$\text{Restraining Torque} = K_2 N_2^2 |I|^2 - K_2 N_3^2 |3I_O|^2 \quad (2)$$

$K_1$ and $K_2$ are constants associated with the electromagnets 34 and 44, respectively, with these constants, which are known for any specific design, being determined by the magnetic circuit and its construction. $N_1$, $N_2$ and $N_3$ are the numbers of turns in windings 40, 50 and 52, respectively. The current quantities are phasors.

Figure 3:
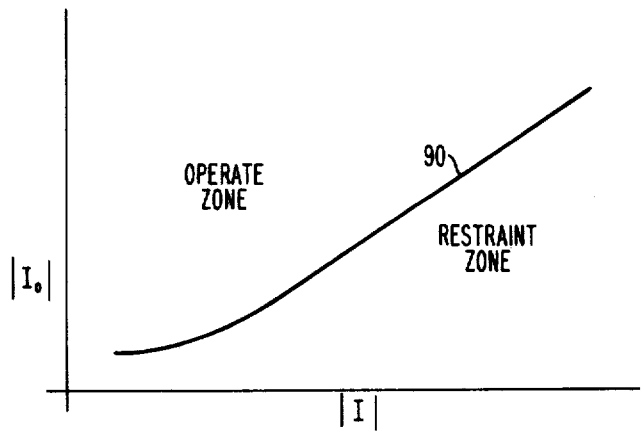
FIG. 3 is a graph which illustrates the operating characteristic of the relay shown in FIG. 1.

FIG. 3 is a graph which illustrates the operating characteristic of relay 10. The unbalanced or $3I_O$ current is plotted on the ordinate and the pre-fault or balanced current $|I|$ is plotted on the abscissa. The position of the line 90 which separates the restraint and operate zones is selectable via the taps on winding 40. The lower the pre-fault balanced current, the less current unbalance which is required to operate the relay.

Figure 4:
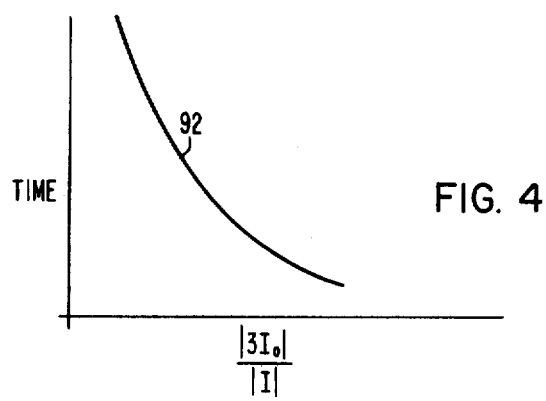
FIG. 4 is a graph which illustrates the inverse time characteristic of the relay shown in FIG. 1.

FIG. 4 is a graph which illustrates the inverse time characteristics of relay 10 which enables it to coordinate the breaker 20 with reclosers and fuses. Time is plotted on the ordinate and percent unbalance is plotted on the abscissa. As indicated by trip line 92, a relatively low percent unbalance will produce a net operating torque which will eventually cause a trip, but the trip time will be quite long, enabling the fault to be cleared by faster operating protective devices, which will isolate a smaller section of the distribution system. A large percent unbalance, however, reduces the operating time. The minimum operating time of the percent unbalance relay should be greater than the minimum operating time of the overcurrent relays, such as about twice as long, for example.

Figure 5:
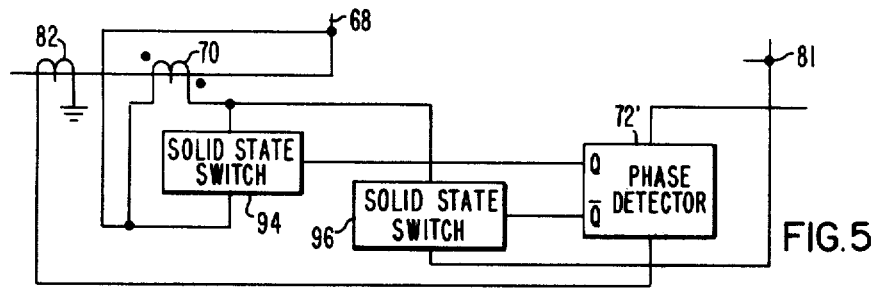
FIG. 5 is a schematic diagram illustrating a modification of the relay shown in FIG. 1.
Figure 6:
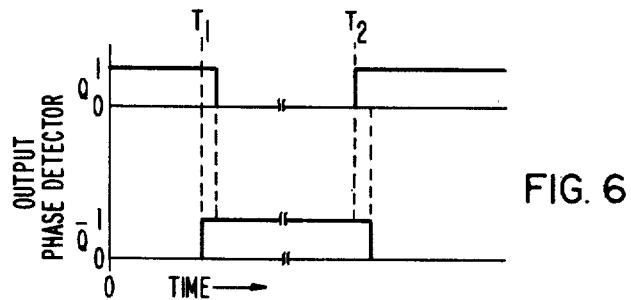
FIG. 6 is a graph which illustrates the output of a phase detector shown in FIG. 5.

Switch 74 in FIGS. 1 and 2 is illustrated as being an electromechanical switch. However, low cost, reliable solid state switch packages are available which may be used. Such a switch package, for example, may include a Triac and a firing circuit. A logic one applied to the switch control input causes the firing circuit to turn on the switch, while a logic zero turns the switch off at the first current zero. Crydom's solid state switch D1240 may be used, for example. FIG. 5 is a schematic diagram which illustrates how the relay 10 of FIG. 1 may be modified to use solid state switches. More specifically, a first solid state switch 94 is connected to short the output of current transformer 70, and a second solid state switch 96 is connected from the undotted end of current transformer 70 to the output 81 of current transformer 60. Phase detector 72' provides logic signals at its Q and $\bar{Q}$ outputs, as illustrated in FIG. 6. At time O, it is assumed that there is no fault in phase a and the Q output provides a logic one to cause switch 94 to conduct and short current transformer 70. At time $T_1$, detector 72' detects a fault in phase a, i.e. the phase a current and the $3I_O$ current are in phase, and the $\bar{Q}$ output goes high to turn switch 96 on. A short time later, the Q output goes low to turn switch 94 off. If the fault clears at time $T_2$, the Q output goes high to turn switch 94 on, and a short time later the $\bar{Q}$ output goes low to turn switch 96 off. Phase detector 72' may be a conventional phase detector which controls a flip-flop. The outputs of the flip-flop may be connected to a pulse stretcher or 1-shot to provide the desired signal overlap which ensures that current transformer 70 will not be open-circuited.

Figure 7:
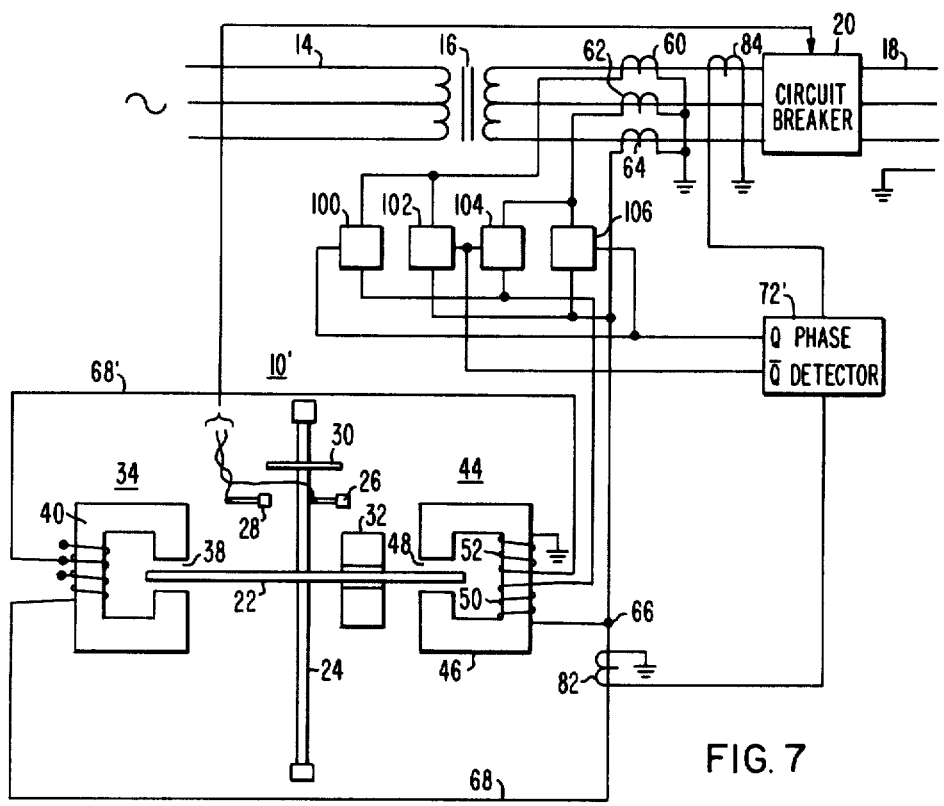
FIG. 7 is a schematic diagram of a percent unbalance relay constructed according to another embodiment of the invention.

FIG. 7 is a schematic diagram of a relay 10', which is similar to relay 10 shown in FIG. 1, except in the way the pre-fault balanced current is provided for winding 50 following a fault in the phase selected to provide the pre-fault current for the restraint winding 50. Instead of diverting the $3I_O$ current away from winding 50 when the fault is in the phase selected to provide current for winding 50, the FIG. 7 embodiment, upon detecting a fault in the selected phase, promptly switches the outputs of two current transformers such that the restraint winding receives current from a different phase. This is accomplished by first, second, third and fourth solid state switches 100, 102, 104 and 106, respectively, and a phase detector 72', which may be the same as just described relative to the FIG. 5 modification of relay 10. Switches 100 an 104 are disposed to connect the outputs of current transformers 60 and 62, respectively, to the input of winding 50, and switches 102 and 106 are disposed to connect the outputs of current transformers 60 and 62 to the output side of winding 50, i.e. to terminal 66. The Q output of detector 72' is connected to the control inputs of switches 100 and 106, and the $\bar{Q}$ output is connected to the control inputs of switches 102 and 104. Thus, when there is no fault in phase a, switches 100 and 106 are conductive, and phase a current $I_a$ flows through winding 50. When a fault occurs in phase a, switches 102 and 104 turn on and switches 100 and 106 turn off, and phase b current $I_b$ flows through winding 50.

In summary, there has been disclosed a percent unbalance relay which will operate when the zero sequence current exceeds a chosen percentage of a pre-fault phase current. This percent unbalance characteristic provides a sensitivity to zero sequence current which varies with load level, and it will thus detect high impedance ground faults, such as due to a broken conductor in contact with the ground, even at light load levels. The variation in restraint torque provided by magnetically subtracting the $3I_O$ current from the phase current in the restraint electromagnet allows the relay to operate on true ratio unbalance regardless of load level. In addition to detecting single-phase-to-ground faults, regardless of fault impedance, the relay has a sensitivity to open phase conditions that is equal to ground fault sensitivity, because of the large unbalance which occurs when a phase opens.

I claim as my invention:

1. A relay for detecting open phases and phase-to-ground faults in a three-phase electrical power system, including high impedance phase-to-ground faults, comprising:

first means providing a first signal responsive to the zero sequence current flowing in the three-phase electrical power system, second means providing a second signal responsive to a phase current with said second means including means responsive to a phase-to-ground fault in said three-phase electrical power system for maintaining the magnitude of said second signal at substantially the same magnitude following said fault as it had prior to said fault, third means providing a restraining quantity which varies as a function of the second signal less the first signal, fourth means providing an operating quantity which varies as a function of the first signal, and translating means responsive to said restraining and operating quantities for providing a predetermined signal when said restraining and operating quantities have a predetermined relationship.

2. The relay of claim 1 wherein the first means includes phase current transformers and a first conductor, with the phase current transformers being connected to provide the first signal in said first conductor, the second means provides the second signal in response to the current in a selected phase, and wherein the second means includes an auxiliary current transformer responsive to the current in said first conductor, switching means, and means for operating said switching means in response to a phase-to-ground fault in the selected phase, with said switching means and said auxiliary current transformer being connected to subtract the zero sequence current from the current in the selected phase when the fault is located in the selected phase, and wherein the second signal is responsive to the difference to cause the second signal to have the same magnitude following the fault as it had prior to the fault.

3. The relay of claim 1 wherein the translating means and the third and fourth means form an electroresponsive induction disc having an electroconductive armature mounted for movement, with the third and fourth means each including winding means which produce alternating magnetic fluxes which act on said armature to provide restraining and operating torques, respectively, and electrical contact means actuatable by said armature to provide the predetermined signal when the restraining and operating torques have the predetermined relationship.

4. A relay for detecting open phases and phase-to-ground faults in A three-phase electrical power system, including high impedance phase-to-ground faults, comprising:

first means providing a first signal responsive to the zero sequence current flowing in the three-phase electrical power system, second means providing a second signal responsive to a phase current, with the magnitude of the second signal being substantially unaffected by a phase-to-ground fault in said three-phase electrical power systems, said second means including means providing a phase current signal responsive to the current in a predetermined phase, and means responsive to a fault being in the predetermined phase for substracting the first signal from said phase current signal, with the second signal being responsive to the difference, third means providing a restraining quantity which varies as a function of the second signal less the first signal, fourth means providing an operating quantity which varies as a function of the first signal, and translating means responsive to said restraining and operating quantities for providing a predetermined signal when said restraining and operating quantities have a predetermined relationship.

5. A relay for detecting open phases and phase-to-ground faults in a three-phase electrical power system, including high impedance phase-to-ground faults, comprising:

first means providing a first signal responsive to the zero sequence current flowing in the three-phase electrical power system, second means providing a second signal responsive to a phase current, with the magnitude of the second signal being substantially unaffected by a phase-to-ground fault in said three-phase electrical power system, said second means including first additional means for providing a phase current signal responsive to the current in a first selected phase, and second additional means responsive to a fault being in said first selected phase for causing said first additional means to provide a phase current signal responsive to the current in a second selected phase, with the phase current signal provided by said first additional means being the second signal, third means providing a restraining quantity which varies as a function of the second signal less the first signal, fourth means providing an operating quantity which varies as a function of the first signal, and translating means responsive to said restraining and operating quantities for providing a predetermined signal when said restraining and operating quantities have a predetermined relationship.

6. A relay for detecting open phases and phase-to-ground faults in a three-phase electrical power system, including high impedance phase-to-ground faults, comprising:

an electroresponsive induction device having an electroconductive armature mounted for movement, first and second means for providing magnetic fluxes which act on said armature when energized, to produce restraining and operating torques, respectively, and electrical contact means actuatable by said armature to provide a predetermined signal when the restraining and operating torques have a predetermined relationship, first means providing a first signal responsive to the zero sequence current flowing in the three-phase electrical power system, and second means providing a second signal responsive to a phase current, with said second means including means responsive to a phase-to-ground fault in said three-phase electrical power system for maintaining the magnitude of said second signal at substantially the same value after said fault as it had prior to said fault, said first means of the induction device being responsive to the second signal minus the first signal, said second means of the induction device being responsive to the first signal.

* * * * *